United States Patent
Payette et al.

(10) Patent No.: US 8,850,414 B2
(45) Date of Patent: Sep. 30, 2014

(54) DIRECT ACCESS OF LANGUAGE METADATA

(75) Inventors: Bruce Payette, Bellevue, WA (US);
George Xie, Sammamish, WA (US);
Jonathan M. Rowlett, Redmond, WA
(US); Lee Holmes, Renton, WA (US);
Jeffrey P. Snover, Woodinville, WA
(US); Jim Truher, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/670,916

(22) Filed: Feb. 2, 2007

(65) Prior Publication Data

US 2008/0189683 A1    Aug. 7, 2008

(51) Int. Cl.
*G06F 9/45*    (2006.01)

(52) U.S. Cl.
CPC ........................................ *G06F 8/41* (2013.01)
USPC ............ 717/141; 717/140; 717/143; 717/151

(58) Field of Classification Search
USPC ........................ 717/136–161; 709/228; 705/8
See application file for complete search history.

(56) References Cited

U.S. PATENT DOCUMENTS

| | | |
|---|---|---|
| 5,086,504 A | 2/1992 | Nemeth-Johannes et al. |
| 5,371,747 A | 12/1994 | Brooks et al. |
| 5,493,678 A | 2/1996 | Arcuri et al. |
| 5,557,720 A | 9/1996 | Brown, Jr. et al. |
| 5,812,851 A | 9/1998 | Levy et al. |
| 5,892,951 A | 4/1999 | Safonov |
| 5,940,619 A | 8/1999 | Abadi et al. |
| 5,956,512 A | 9/1999 | Simmons et al. |
| 6,044,217 A * | 3/2000 | Brealey et al. ................ 717/107 |
| 6,269,475 B1 | 7/2001 | Farrell et al. |
| 6,353,823 B1 * | 3/2002 | Kumar ................................. 1/1 |
| 6,353,925 B1 | 3/2002 | Stata et al. |
| 6,523,171 B1 | 2/2003 | Dupuy et al. |
| 6,523,172 B1 * | 2/2003 | Martinez-Guerra et al. . 717/143 |
| 6,560,774 B1 | 5/2003 | Gordon et al. |
| 6,748,585 B2 | 6/2004 | Proebsting et al. |
| 6,754,884 B1 | 6/2004 | Lucas et al. |
| 6,778,949 B2 | 8/2004 | Duan et al. |
| 6,807,548 B1 | 10/2004 | Kemper |
| 6,834,284 B2 | 12/2004 | Acker et al. |
| 6,836,884 B1 * | 12/2004 | Evans et al. ................... 717/140 |
| 6,993,744 B2 | 1/2006 | Hills |
| 7,003,764 B2 | 2/2006 | Allison |
| 7,065,742 B1 | 6/2006 | Bogdan |

(Continued)

FOREIGN PATENT DOCUMENTS

WO    W09203782 A1    3/1992

OTHER PUBLICATIONS

Cammert et al., Dynamic Metadata Management for Scalable Stream Processing Systems, Citeseer, 2007, pp. 1-10.*

(Continued)

*Primary Examiner* — Satish Rampuria
(74) *Attorney, Agent, or Firm* — Jim Sfekas; Kate Drakos; Micky Minhas

(57) ABSTRACT

Method and system for direct access of language metadata are disclosed. In an implementation, the method includes receiving commands from a user to modify language metadata of a programming language. The metadata is modified based on the command and the modified metadata is utilized as a feature in the programming language at runtime.

18 Claims, 9 Drawing Sheets

(56) References Cited

U.S. PATENT DOCUMENTS

| | | | |
|---|---|---|---|
| 7,086,041 | B2 | 8/2006 | Plesko et al. |
| 7,130,863 | B2 * | 10/2006 | Diab .................................... 1/1 |
| 7,150,010 | B1 | 12/2006 | Ringseth et al. |
| 7,210,130 | B2 | 4/2007 | Fairweather |
| 7,219,338 | B2 | 5/2007 | Venter |
| 7,516,441 | B2 * | 4/2009 | Hamilton et al. ............. 717/110 |
| 2002/0194223 | A1 | 12/2002 | Meyers et al. |
| 2004/0083464 | A1 * | 4/2004 | Cwalina et al. ............... 717/141 |
| 2004/0255267 | A1 * | 12/2004 | Meijer ......................... 717/106 |
| 2004/0255268 | A1 | 12/2004 | Meijer et al. |
| 2004/0268305 | A1 | 12/2004 | Hogg et al. |
| 2005/0015753 | A1 | 1/2005 | Meijer et al. |
| 2005/0034109 | A1 * | 2/2005 | Hamilton et al. ............. 717/140 |
| 2005/0050525 | A1 | 3/2005 | Chittar et al. |
| 2005/0081193 | A1 | 4/2005 | Chiles et al. |
| 2005/0091655 | A1 | 4/2005 | Probert et al. |
| 2005/0278710 | A1 | 12/2005 | Lucas et al. |
| 2006/0074736 | A1 * | 4/2006 | Shukla et al. ..................... 705/8 |
| 2006/0136814 | A1 | 6/2006 | Spada |
| 2006/0143597 | A1 | 6/2006 | Alaluf et al. |
| 2006/0212859 | A1 | 9/2006 | Parker et al. |
| 2007/0044066 | A1 | 2/2007 | Meijer et al. |
| 2007/0300212 | A1 | 12/2007 | Kersters |
| 2008/0109528 | A1 * | 5/2008 | Knight et al. ................. 709/217 |
| 2008/0189683 | A1 | 8/2008 | Payette et al. |

OTHER PUBLICATIONS

Manolescu et al., Dynamic object model and adaptive workflow, Citeseer, 1998, pp. 1-19.*

Rahman et al., Making frameworks more useable: using model introspection and metadata to develop model processing tools, Obtained from http://www.sciencedirect.com, Published in 2003, pp. 275-284.*

Aubrecht, Petr, and Zdenek Kouba. "Metadata driven data transformation." Proceedings of the World Multiconference on Systemics, Cybernetics and Informatics (ISAS SCI). 2001, pp. 1-5.*

Lafferty, Donal, and Vinny Cahill. "Language-independent aspect-oriented programming." ACM SIGPLAN Notices. vol. 38. No. 11. ACM, 2003, pp. 1-12.*

Nadkarni, Prakash M., Cynthia M. Brandt, and Luis Marenco. "WebEAV Automatic Metadata-driven Generation of Web Interfaces to Entity-Attribute-Value Databases." Journal of the American Medical Informatics Association 7.4 (2000): 343-356.*

Dijcks, "Embed Oracle Warehouse Builder in your Applications Using Scripting", retrieved at <<http://www.oracle.com/technology/products/warehouse/pdf/OWB_Scripting_Paper.pdf>>, Oracle Corporation, Feb. 2004, 19 pages.

Frei, et al., "A Dynamic AOP-Engine for .NET", available at least as early as Nov. 22, 2006 at <<http://www.inf.ethz.ch/personal/andfrei/docs/daopnetpdf>>, Swiss Federal Institute of Technology Zurich, 11 pages.

Hamilton, "Language Integration in the Common Language Runtime", available at least as early as Nov. 22, 2006 at <<http://delivery.acm.org/10.1145/780000/772973/p19-hamilton.pdf?key1=772973&key2=9511814611&coll=GUIDE&dl=GUIDE&CFID=5092273&CFTOKEN=76425385>>, SIGPLAN Notices, vol. 38(2), pp. 19-28.

Fuchs, "Using Scoping Rules as a Distributed Coordination Language", retrieved at <<http://ieeexplore.ieee.org/iel4/5350/14646/00667281.pdf?isNumber= >>, IEEE Proceedings 30th Intl Conf on System Sciences, Jan. 1997, pp. 340-348.

Jordan, et al., "Modular System Building with Java Packages", retrieved at <<http://ieeexplore.ieee.org/iel3/4481/12719/00591827.pdf?isNumber=>>, IEEE 8th Conf on Software Engineering Environments, Apr. 1997, pp. 155-163.

Mark, et al., "Cg: A System for Programming Graphics Hardware in a C-like Language", retrieved at <<http://www-csl.csres.utexas.edu/users/billmark/pubs/cgpaper.pdf>>, ACM Transactions on Graphics, Proceedings SIGGRAPH 2003, vol. 22, Issue 3, Jul. 2003, pp. 12.

* cited by examiner

DIRECT ACCESS OF LANGUAGE METADATA

BACKGROUND

Users of programming languages normally discover the programming language features (e.g., semantic, lexical, or syntactic features) through a language guide. The language guide needs to be updated as the programming language evolves. Implementation of new features of the programming language may be difficult because the new features and a corresponding help guide are usually owned by different software development teams and may be released through different vehicles. Some platforms, for example, an operating system such as UNIX, provide a help system for exposing feature information to the users. In such an approach, the help content may not reflect implementation of the feature because help content is developed independent of implementation details for the specific feature.

Language metadata may be used to drive language implementation and allow users to discover programming language features. Besides feature discovery, this metadata may be used to control a particular programming language feature. In some programming languages, for example, C# and Java, usage of language metadata may be limited to program data structures only.

SUMMARY

This Summary is provided to introduce simplified concepts for direct access of language metadata, which is further described below in the Detailed Description. This Summary is not intended to identify essential features of the claimed subject matter, nor is it intended for use in determining the scope of the claimed subject matter.

A method and a system for direct access of language metadata are disclosed. According to an implementation, the method includes executing user commands to modify language metadata of a programming language. The metadata is modified based on the command and the modified metadata is utilized as a new feature in the programming language at runtime.

BRIEF DESCRIPTION OF THE FIGURES

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for direct access of language metadata in a programming language. While aspects of described systems and methods for direct access of language metadata can be implemented in any number of different computing systems, environments, and/or configurations, embodiments of the systems and methods are described in the context of the following exemplary system architecture(s).

For purposes of exemplary illustrations in the following description, a compiler includes a computer program or set of programs that translates text written in a computer programming language (a source language) into another computer language (a target language). The reasons for wanting to translate a source language to target language include creating a machine code or an executable output program. For purposes of exemplary illustration, source code is referred to as input script and target code is referred to as output program.

Furthermore, an interpreter in the foregoing description includes translating program which converts high level language into machine code. It may also include execution programs that execute the machine code. For purposes of exemplary illustration, high level language has been referred to as input script and machine code has been referred to as output program in the following description.

Existing programs may be compiled using an updated or modified compiler for the programming language to take advantage of performance enhancements and other code generation features. For languages that use literals, keywords and identifiers, for example, C/C++, Pascal, Visual Basic, C#, and Java, etc., it may be desirable to add new keywords at runtime, even though existing programs may use identifiers with the same name as a new keyword. Each statement in the programming language may start with either an identifier or a keyword.

Systems and methods are disclosed for direct access of language metadata. Language metadata includes controlling data used in software architectures that are more abstract or configurable. Language metadata may usually be included in executable file formats to specify certain, usually configurable, behavioral runtime characteristics of a programming language. The disclosed methods and systems extend the features of a programming language to include modified compilation and interpretation of language features, particularly keywords, literal sequences, and operators, etc. In an implementation, the systems and methods enable versioning of the programming language allow a programming language designer to partition the definition of programming language features into logical groupings using language metadata. The language metadata may also be modified at runtime upon receipt of commands from a user. In such an implementation, the modified language metadata may be utilized by the compiler and interpreter of the programming language for subsequent processing of input scripts.

Exemplary System

Figure 1:
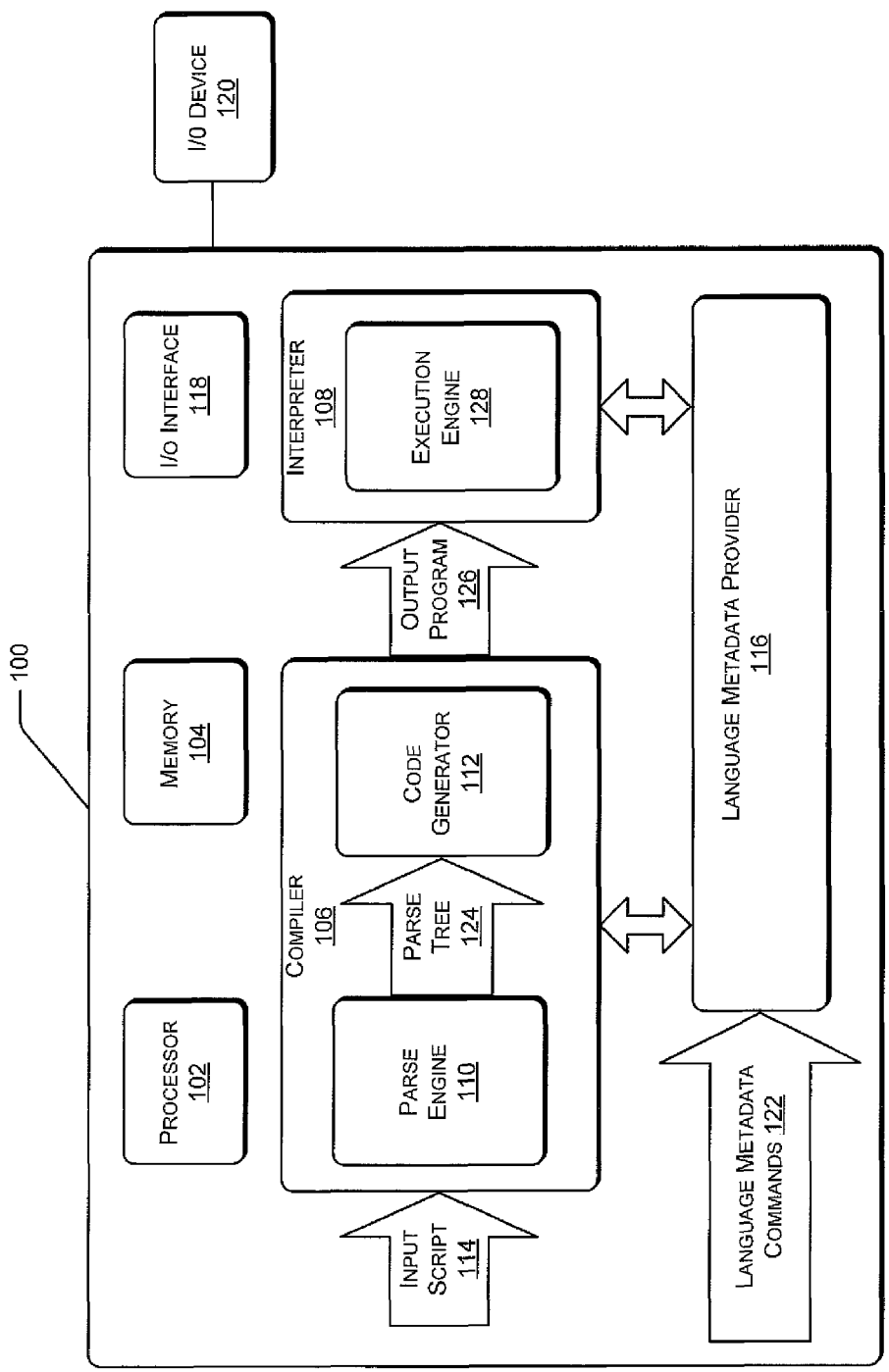
FIG. 1 is an illustration of an exemplary system for direct access of language metadata in a programming language.

FIG. 1 shows a system 100 for direct access of language metadata in a programming language. The system 100 may be implemented as or part of a computing device. To this end, the system 100 includes one or more processors 102 coupled to a memory 104. Such processors could be for example, microprocessors, microcomputers, microcontrollers, digital signal processors, central processing units, state machines, logic circuitries, and/or any devices that manipulate data based on operational instructions. The processors are configured to fetch and execute computer-program instructions stored in the memory 104. Such memory 104 includes, for example, one or more combination(s) of volatile memory (e.g., RAM) and non-volatile memory (e.g., ROM, Flash etc.). In an exemplary implementation, the memory 104 includes operating system (not shown in the figure) providing a platform for executing applications on the system 100.

The memory 104 stores computer executable instructions and data for direct access of language metadata. It may be appreciated that the direct access of language metadata may be achieved by a compiler 106 or an interpreter 108 which may reside in the memory 104 or may be implemented in a separate module.

The compiler 106 may include a parse engine 110 and a code generator 112. The compiler 106 receives input script and generates an output program for execution. The execution is performed by the interpreter 108. The input script 114 may be received by the interpreter 108. The system 100 further includes a language metadata provider 116 that provides for the metadata requirements of the compiler 106 and the interpreter 108. In the exemplary implementation, the language metadata provider 116 may be configured to receive commands from a user. To this end, the system includes an Input/Output (I/O) interface 118 that enables a user to provide inputs from an Input/Output (I/O) device 120. In such an implementation, the user provides language metadata commands 120 through the I/O device 120. The language metadata provider 116 can modify language metadata of the programming language based on the language metadata commands 122. The modified language metadata may be utilized by the compiler 106 and the interpreter 108 for successive parsing and execution functions respectively. Although, the language metadata provider 116 has been shown as a separate module, it may be appreciated that it may be implemented as part of the compiler 106 or the interpreter 108 respectively.

The compiler 106 receives the input script 114 and generates a parse tree 124 by employing the parse engine 110. For purposes of exemplary illustration, generation of a parse tree includes a process of analyzing an input sequence of input script 114 in order to determine its grammatical structure with respect to a given formal grammar. Syntax of each programming language is defined by formal grammar. The parse engine 110 transforms input script 114 into a data structure, for example, a parse tree 124, which is suitable for later processing and which captures implied hierarchy of the input script 114. The parse tree 124 may include a syntax tree that represents the syntactic structure of a string according to the formal grammar. In an implementation, the parse tree 124 is made up of nodes and branches. In a parse tree, such as parse tree 124, nodes may be referred to as parent nodes and child nodes. A parent node has at least one other node linked by a branch when traversing the tree from top to bottom. Nodes other than parent nodes may be referred to as child nodes.

It is to be appreciated that the input script may be converted to tokens by a tokenizer (not shown). The tokens may be utilized by the parse engine 110 to generate parse tree 124. The parser engine 110 may be configured to modify the parse tree 124 to allow registering of new nodes in the parse tree 124 of the grammar. This may be accomplished by modifying language metadata of the programming language. The modification of the parse tree 124 may be determined and performed based on language metadata generated and maintained by the language metadata provider 116. As described above, it may be desirable to modify existing features of a program or add new ones to the existing ones at runtime. To this end, the language metadata provider 116 enables the modification of language metadata. This modified language metadata may be utilized by the compiler 106 to modify the parse tree 116 to include definitions of new nodes in the grammar of the programming language. In an implementation, the new nodes may override and obscure existing nodes or extension sub-nodes of existing nodes.

The code generator 112 receives the parse tree 124 and generates an output program 126. The output program 126 may include executable programs. The output program 126 may be executed using an execution engine 128 included in the interpreter 108 as shown in FIG. 1.

The language metadata provider 116 enables a user to manipulate language metadata at runtime and thus change language behavior. For example, the user may add a '^' operator into the language metadata by issuing commands for adding an entry into the language metadata. From then on, '^' becomes an operator that may be used in the programming language. Similarly, programmers may remove/change features from the programming language by removing/changing some of language metadata entries. In such a scenario, the language metadata provider 114 enables the programmer to extend the features of programming language. In an alternate embodiment, a user may define new keywords, operators, and statements by providing language metadata commands 122. Such definitions may be attached to an execution engine 128 and the parse engine 110 at runtime. The user may share their language extension as a script to be included in other scripts.

A user may remove features from a programming language so that it becomes safer to use by reducing the capabilities of the language. For example, the user may publish web service through some programs written with a programming language. In such a case, some of the features in the programming language may be disabled through language metadata to meet security requirement.

Exemplary Language Metadata Provider

Figure 2:
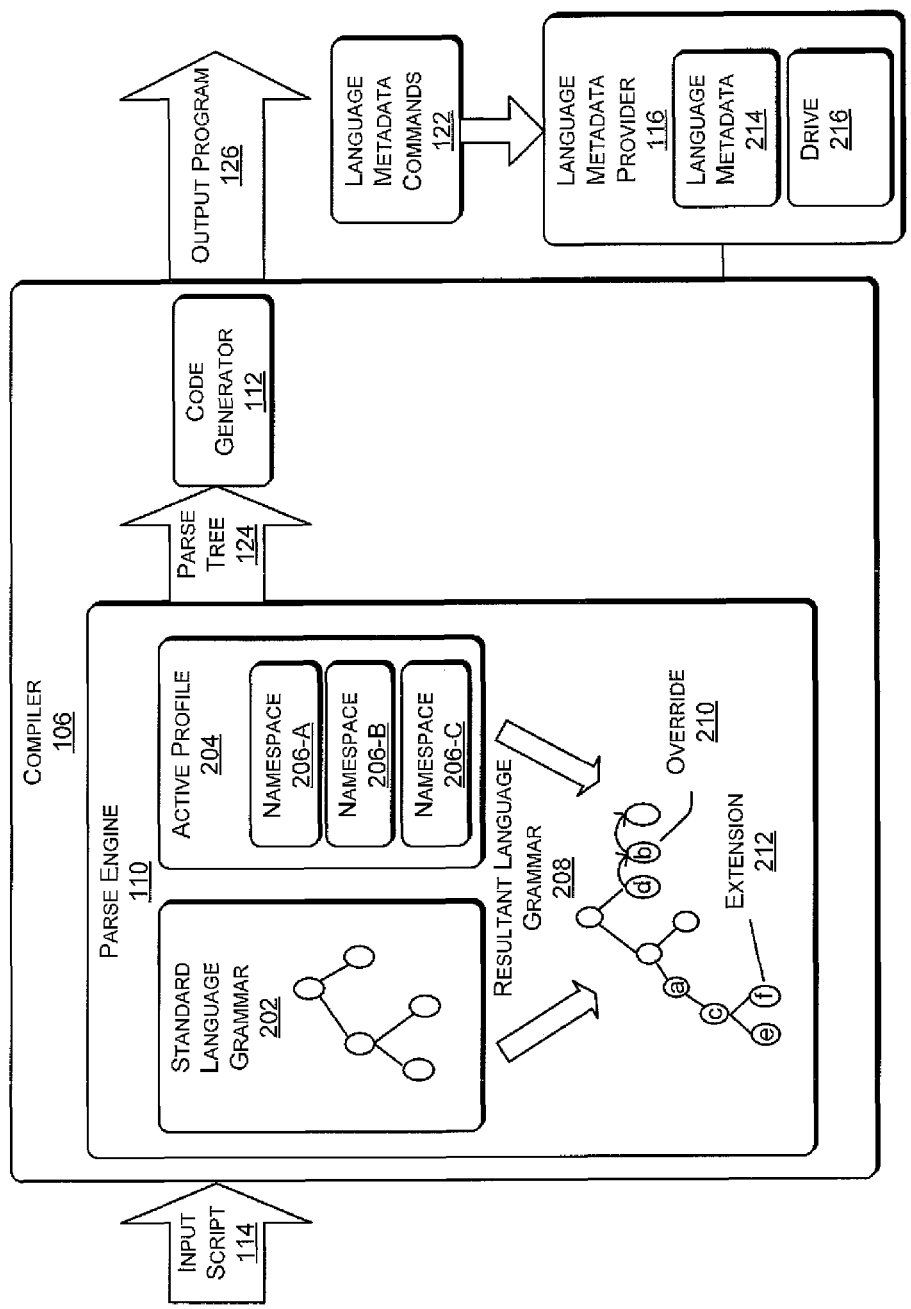
FIG. 2 is an illustration of runtime interactions between an exemplary compiler and an exemplary language metadata provider according to an implementation.

FIG. 2 shows runtime interactions between the compiler 106 and the language metadata provider 116 according to an implementation. Accordingly, the parse engine 110 includes a standard language grammar 202 which includes definitions of features of a programming language. For example, syntax for the programming language may be defined in the standard language grammar 202. The parse engine 110 utilizes the standard language grammar 202 to extract syntax information of the programming language.

In the exemplary embodiment, the parse engine 110 includes an active profile 204 to define a sequence of namespaces 206-A, 206-B, and 206-C, etc. Although only one active profile 204 is illustrated, it is to be appreciated that one or more active profiles may be implemented. In the foregoing context, a namespace includes an abstract container providing context for the items such as names, or technical terms, etc. The namespace may hold and allow disambiguation of items having the same name residing in different namespaces. For many programming languages, the namespace may be a context for identifiers. In this example, the namespaces 206-A, 206-B, and 206-C include nodes that can be parsed at any given point in the grammar. Although only three namespaces 206 have been shown in the figure, it may be appreciated that any number of namespaces 206 may be included in the active profile 204 depending upon the requirement of the parse engine 110 for parsing the input script 122.

For purposes of exemplary illustration, an active profile includes a sequence of namespaces that includes correct nodes that can be parsed at a point in the grammar. The parse engine 110 may parse the tokens representing the received input scripts 122 to generate a modified parse tree 124 which includes new nodes defined in the namespaces 206. This may be accomplished by modifying language metadata 214 maintained in the language metadata provider 116. Such modifications may be utilized by the active profile 204 to include namespaces 206 that define new nodes that may be used in the language grammar 202 for generating a modified parse tree 124.

The active profile 204 can determine the modification of the parse tree 124 based on the modifications of the language metadata 214 included in the language metadata provider 116. In such an implementation, the active profile 204 determines a correct node to be utilized in the modified parse tree 124. For example, it may be desirable to include new syntactic, semantic, or lexical features in a programming language at runtime. In such an implementation, the language metadata provider 116 enables the modification of the parse tree 124 based on language metadata commands 122.

A resultant language grammar 208 determines generation of the parse tree 124 at any given instant. For each node, the parse engine 110 utilizes the active profile 204 to select and use one or more namespaces 206-A, 206-B, and 206-C. In such an implementation, a new node registered in the active profile 204 may be an override 210, of the existing node represented as "b." A new node may also be an extension 212 of the existing nodes, represented as "f" in the figure. The modified parse tree 124 may be received by the code generator 112 which generates an output program 126.

The language metadata provider 116 may maintain a language metadata 214 that provides for metadata requirements of the compiler 106 and the interpreter 108. To this end, the language metadata provider 116 includes language metadata 214 and a drive 216. The language metadata 214 is a dynamic collection of metadata to be used by the parse engine 110 for parsing functions. In yet another implementation, the language metadata 214 includes namespace data to be utilized by the active profile 204 for providing nodes in the parse tree 124.

The language metadata provider 116 may provide logic for navigating and manipulating language metadata 214. The language metadata entries may be added or removed from language metadata 214 through language metadata provider 116. The language metadata provider 116 merges language metadata entries into namespace elements in the language metadata 214 and makes sure that the consistency between different language metadata entries is maintained.

The language metadata provider 116 may also provide navigation and manipulation capabilities to other parts of programming language engine and command line. To this end, the language metadata provider 116 includes a drive 216 responsible for management of language metadata 214 at runtime. This may be accomplished by configuring the drive 216 to intercept language metadata commands 120 issued by the user. In such an implementation, the user may define new operators, statements, keywords, etc., resulting in modification of language metadata 214 at runtime. The modified language metadata 214 may be utilized by, for example, the parse engine 110 for parsing the tokens corresponding to the input script 122. In another implementation, the modified language metadata 214 may be utilized by the interpreter 108 for execution of output program 126.

Figure 3:
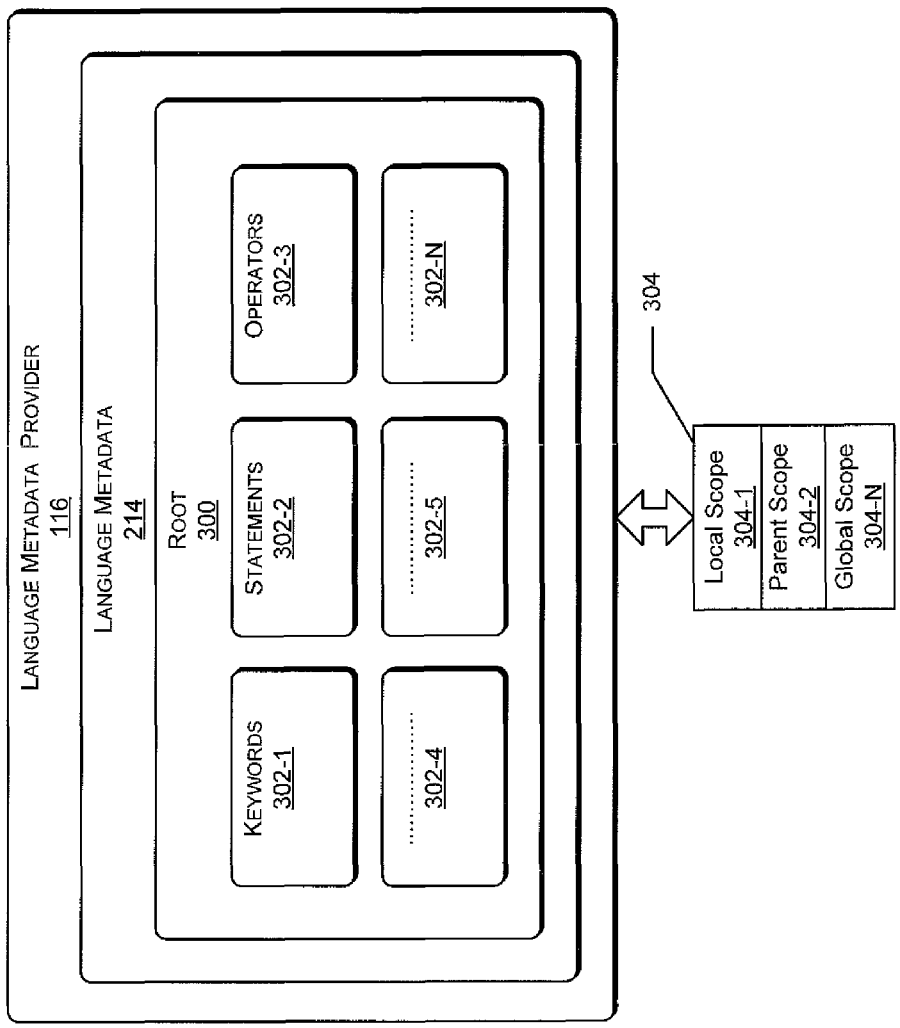
FIG. 3 is an illustration of an exemplary language metadata provider and a language metadata stack according to an embodiment.

FIG. 3 shows an exemplary language metadata provider 114 for direct access of language metadata 214. Accordingly, the language metadata 214 may be implemented as a 2-D array of namespace elements 302 beginning with a root 300.

The namespace elements 302 include keywords 302-1, statements 302-2, operators 302-3, and so on. It may be appreciated that any number of user defined namespace elements as depicted by 302-4, 302-5, ..., 302-N, may be included. These user defined namespace elements 302 may be modified based on language metadata commands 120 issued by the user. In such an embodiment, the modified namespace elements may be utilized by the parse engine 110 and the execution engine 108 thereafter. The namespace element 302-1 may include keywords, for example, "if", "else", "switch", and "for", etc. The namespace element 302-2 may include statements, for example, branching statements and iteration statements, etc. The namespace element 302-3 may include operators, for example, logic operators, bitwise operators and, arithmetic operators, etc. It is to be appreciated that these are only a few examples of the namespace elements and user defined namespaces may be included to be classified under one of the namespace elements 302.

The namespace elements 302 may be so modified to define a language metadata stack 304 for language metadata 214 as shown in the figure. Accordingly, it may be useful to restrict the scope of modified language metadata to a particular session of the user. To this end, modifications to the language metadata 214 may be scoped so that the modifications do not impact the behavior of the programming language after a predetermined time or a number of user sessions. In the exemplary embodiment, the language metadata provider 114 creates and maintains the language metadata stack 304. The drive 216 defines a scope for each of the user defined namespace elements 302. To achieve this, language metadata can be arranged into a stack structure, with each stack frame corresponding to one layer of scoping. The language metadata stack 304 includes a local scope 304-1, a parental scope 304-1, ..., global scope 304-N, etc. The bottom of the stack represents a global scope of language metadata, and includes the language metadata 214 (organized in namespace structure) when engines of the programming language are started. For example, during execution of the input script 122, a new scope layer may be created and language metadata entries may be added, removed, or changed. In order to be able to revert to original programming language structure after the execution of the input script 122, the language metadata provider 116 exits the new scope created while executing. The language metadata provider 116 may revert to any other scope in the language metadata stack 304 below the new scope. For example, the new scope may be a local scope 304-1; however, the language metadata provider 116 may be configured to revert to parent scope 304-2 after the execution of local scope for input scripts 122. Similarly, after a number of such executions, the language metadata provider 116 may utilize the global scope 304-N, which corresponds to the namespace elements at the time of first execution.

Language metadata provider 116 may be configured to merge language metadata 214 corresponding to different scopes to generate a unified language metadata structure for parse engine 110 to use at runtime. In such an implementation, the language metadata provider 116 allows execution engine 128 to change language metadata 214 at different levels of language metadata stack 304. Modifications of the language metadata 214 may either be global or within a particular scope. Global language metadata modifications may be applied to execution engine 128 until the programming language session is restarted. Scoped language metadata changes will be applied only to the particular scope layer. When execution exits the scope, language metadata provider 116 reverts to initial scope at the time of first execution.

Exemplary Language Metadata Structure

Figure 4:
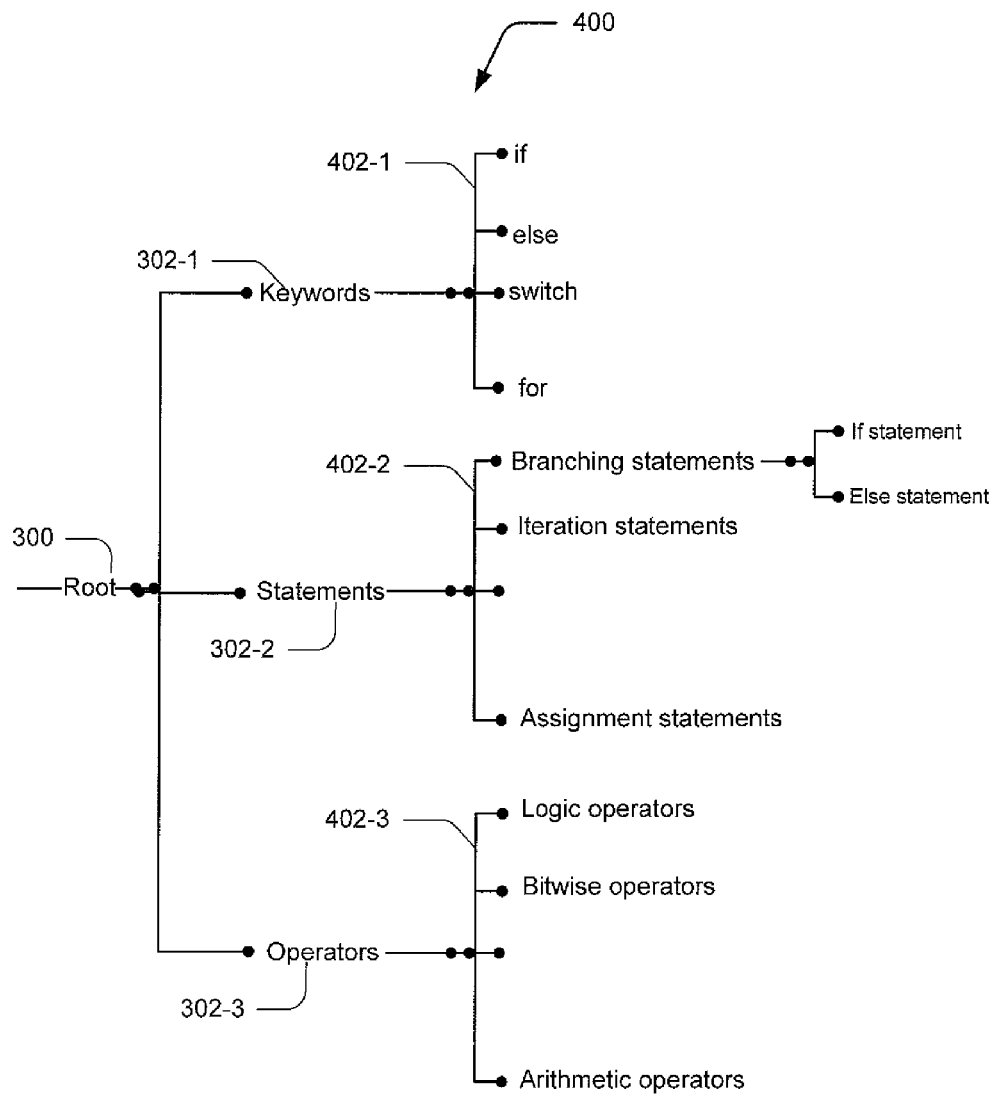
FIG. 4 is an illustration of an exemplary namespace structure of language metadata in an implementation.

FIG. 4 illustrates an exemplary language metadata namespace structure 400. The structure 400 includes a tree structure beginning with a root 300. The structure further includes branches from the root 300 to namespace elements 302. As shown in the figure, the root 300 branches with keywords 302-1, statements 302-2 and operators 302-3. It is to be appreciated that although only three namespace elements 302 of the language metadata 214 have been illustrated in the figure, the language metadata namespace structure 400 may be implemented to include all the namespace elements 302 of the language metadata 214. The namespace elements 302-1, 302-1, and 302-3 include further branches leading to instances of each of the namespace elements 302. These instances are shown as 402-1, 402-2, and 403-3 for the corresponding namespace elements 302-1, 302-2, and 302-3 respectively. The instances of the namespace elements 402-1 include, for example, "if", "else", "switch", "for", etc. Similarly, the instances of the namespace elements 402-2 include, for example, branching statements, iteration statements, assignments statements, etc. The branching statements have been further classified as: if statement and else statement. The instances of the namespace element 302-3 include, for example, logic operations, bitwise operations, and arithmetic operations, etc. The implementation as described above enables grouping of namespace elements 302 in the language metadata 214. Such groupings may be based on feature, version, and author of the programming language. It is to be appreciated that other namespace structures may be implemented, for example, a 2-D array, or a stack etc.

Figure 5A:
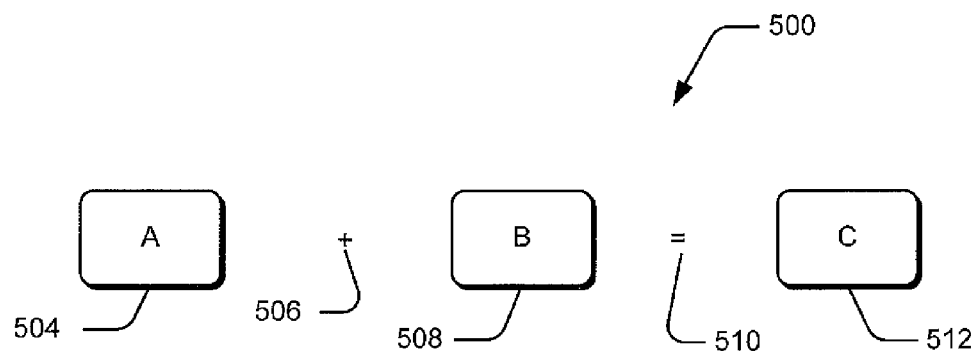
FIGS. 5A and 5B is an illustration of a stream of tokens and a corresponding parse tree respectively.

FIG. 5A shows a sequence of tokens 500 as generated in the compiler 106 according to an implementation. The sequence of tokens corresponds to a mathematical expression: A+C=B received as the input script 114.

As shown in the FIG. 5A, operands "A", "C", and "B" have been represented by tokens 504, 508, and 512 respectively. In addition, operators "+" and "=" are represented by token 506 and 510 respectively. In an implementation, the compiler 106 implements a tokenizer to generate tokens from the input script 114. Such a tokenizer may be associated with one or more token extensions. The token extensions register a sequence of specific characters or character ranges that describe the start of the tokens in the input script 122. The tokenizer may be modified based on the modification of the language metadata 214 allowing for new character sequences, which do not start with white space characters, to be read as tokens. In such an implementation, the token extension is associated with active profile 204 to define and maintain a sequence of characters to mark the start of token. The tokenizer may in accordance with the active profile 204, generate the tokens 500. As described above, the active profile 204 may be modified based on the modifications to the namespace elements 302 included in the language metadata 214. It is to be appreciated that language metadata provider 116 may be configured to update the tokenizer and the active profile 204 to reflect immediate modifications in the language metadata 214.

Figure 5B:
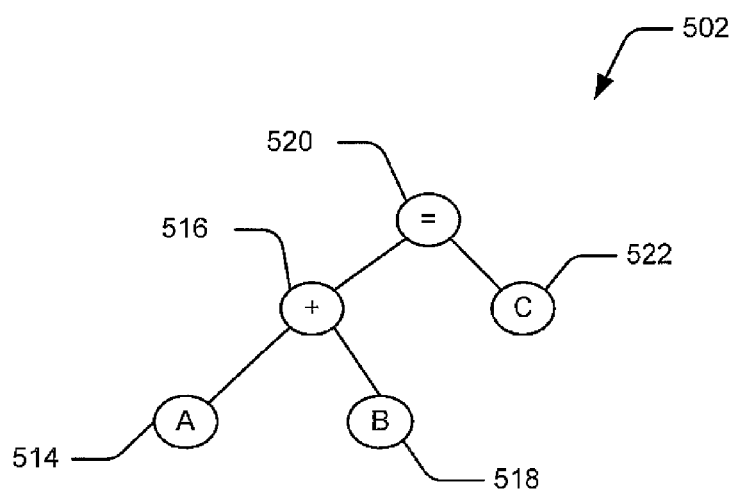

FIG. 5B illustrates a parse tree 502 for the sequence of tokens 500 according to an implementation. The parse tree 502 may be an instance of the parse tree 124. As shown in the figure, the operands "A", "B", "C" are represented as nodes 514, 518, 522 and the operators "+" and "=" are represented as nodes 516 and 520 respectively. The parse tree 502 may be generated by the parser engine 110 based on an order of precedence of the operators. It is to be appreciated that operator precedence known in the art may be implemented for the purposes of parsing the sequence of tokens 500 to generate the parse tree 502.

Exemplary Modifiable Parse Tree

Figure 6:
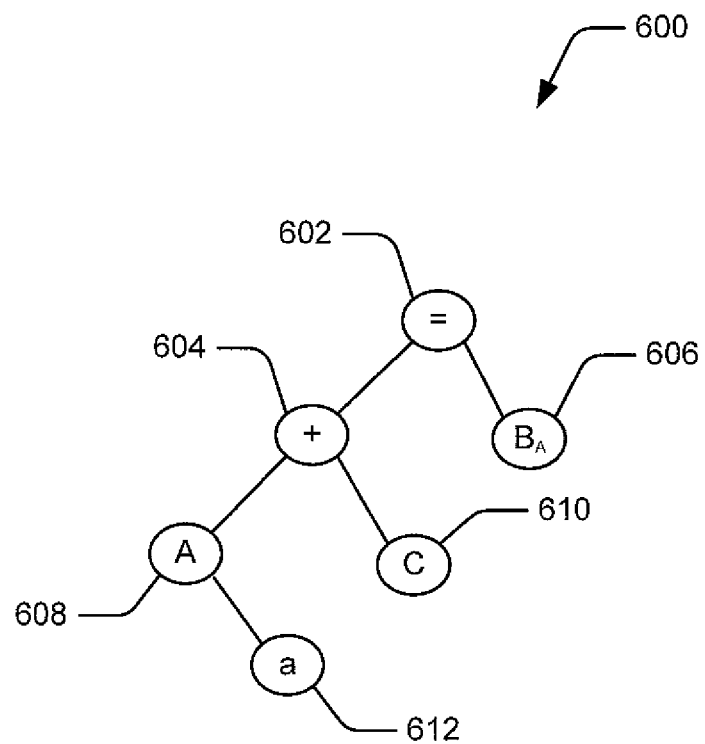
FIG. 6 is an illustration of a modified parse tree as a result of modified language metadata.

FIG. 6 illustrates a modifiable parse tree 600, which is another instance of a parse tree 124, for a mathematical expression according to an embodiment. Accordingly, the parse tree 502 has been modified based on the modifications of the namespace elements 302 in the language metadata 214. The modifiable parse tree 600 represents the mathematical expression: A+C=B.

The modifiable parse tree 600 includes the operator "=" as a parent node 602 with the operator "+" and the operand "$B_A$" as the child nodes 604 and 606. The node 604 becomes the parent node for the child nodes 608 and 610 that correspond to the operands "A" and "C" respectively. Node 608 has yet another child node 612 corresponding to a new node "a". The nodes 606 and 612 correspond to new nodes registered by the active profile 204. The modifiable parse tree 600 may be modified in accordance with the active profile 204. Each parent node determines which node to create as a child node. Each parent node passes on the active profile 204 to corresponding child nodes thereby resolving namespace conflicts. The active profile 204 reflects any changes made in the language metadata 214. Scope of modifications to the language metadata 214 may be defined and maintained in the language metadata stack 304. In such an implementation, the modifiable parse tree 600 is generated by the parse engine 110 based on the particular scope defined in the language metadata stack 304.

Exemplary Method

Exemplary methods for direct access of language metadata in programming language are described with reference to FIGS. 1 to 6. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 7:
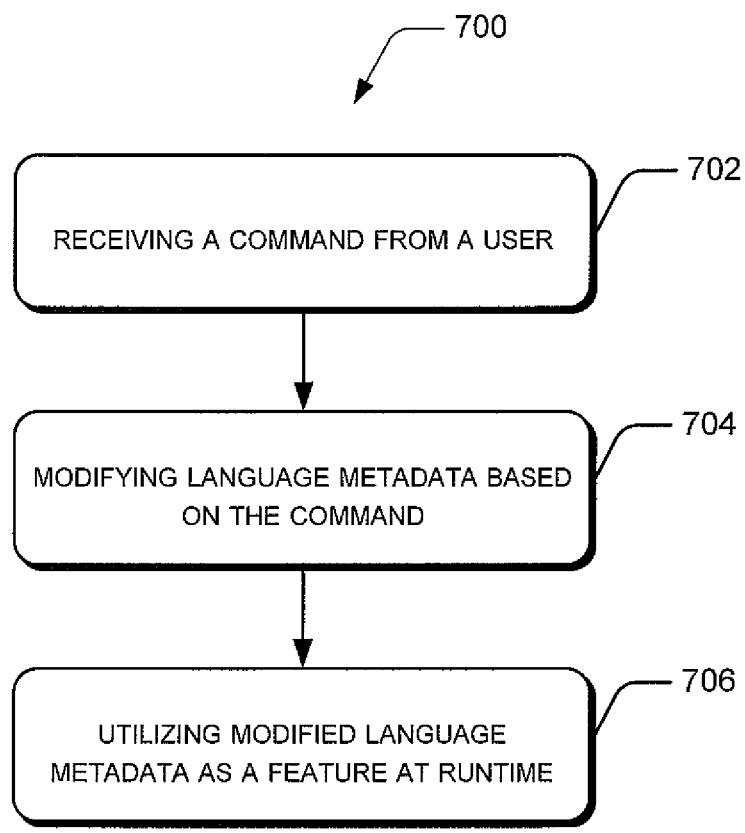
FIG. 7 is an illustration of a method for direct access of language metadata.

FIG. 7 illustrates an exemplary method 700 for direct access of language metadata in a programming language. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 702, commands are received from a user to modify language metadata of a programming language. The user issues language metadata commands 120 for modifying the language metadata 214. The language metadata provider 114 intercepts the commands and generates and maintains modifiable language metadata 214. The language metadata commands 120 include details of scope of the modifications to the language metadata 214.

At block 704, the language metadata is modified based on the commands from the user. In an implementation, the language metadata provider 114 modifies the language metadata 214 at runtime based on the language metadata commands 120. To this end, the drive 216 intercepts the language metadata commands 120 and modifies namespace elements 302. The modification can include changing, removing, or defining a namespace element 302. The language metadata provider 114 generates and maintains a language metadata stack 304 which represents scope of modifications to the language metadata 214.

At block 706, the modified language metadata is utilized as a feature of the programming language at runtime. The parse engine 110 can utilize the modified namespace elements 302 for generating a modified parse tree 600. The execution engine 128 included in the interpreter 108 utilizes the modified language metadata 214 for execution of successive input scripts 122 or the output program 126.

Figure 8:
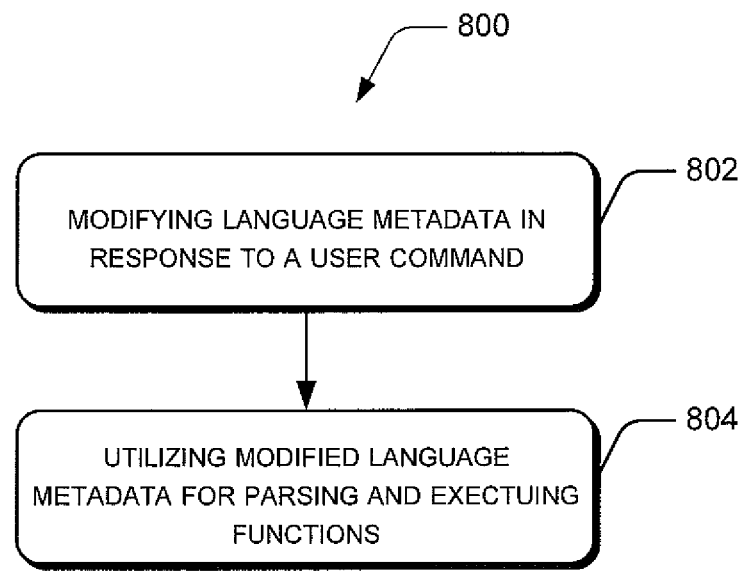
FIG. 8 is an illustration of another method for direct access of language metadata.

FIG. 8 illustrates another exemplary method 800 for direct access of language metadata in a programming language. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 802, language metadata of a programming language is modified at runtime responsive to a command from a user. In an exemplary implementation, language metadata provider 114 defines new namespace elements 302 based on the language metadata commands 120. The active profile 204 of the parse engine 110 may be modified to include definitions for new nodes at runtime. The tokenizer included in the compiler 106 may be modified to include token extensions to define characters to mark the start of sequence of tokens 500 in the input script 122. The language metadata provider 114 may generate and maintain language metadata 214 in a language metadata namespace structure 400. The namespace elements 302 may be arranged in a tree structure with branches leading to instances 402 of the namespace elements 302.

At 804, the modified language metadata is utilized for executing and parsing functions of the programming language. The parse engine 110 may generate a modifiable parse tree 600 based on the modified active profile 204. The execution engine 128 included in the interpreter 108 may perform execution based on the modified language metadata 214.

Figure 9:
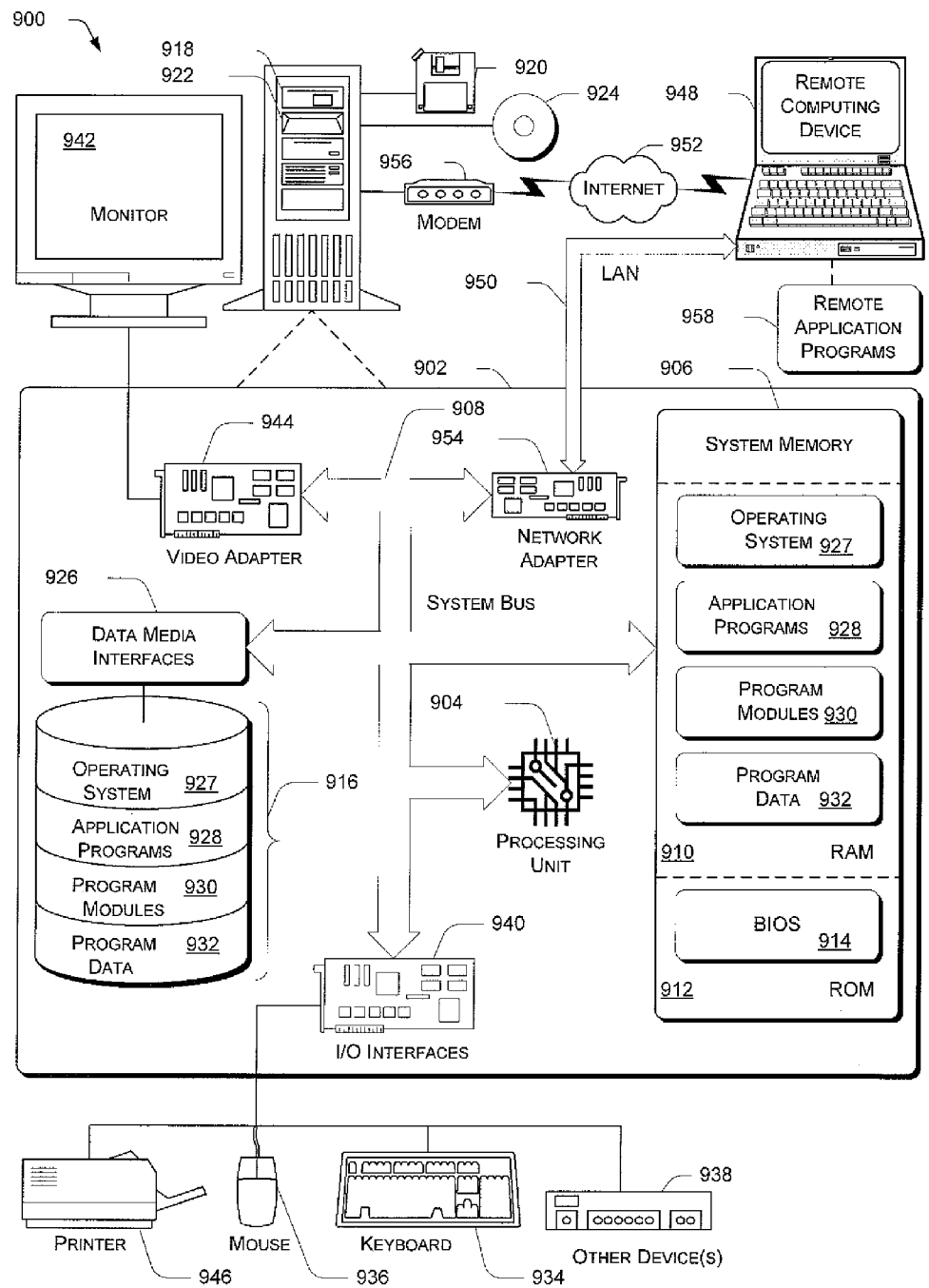
FIG. 9 is an illustration of an exemplary computing environment for the implementation of the exemplary system and method for direct access of language metadata.

Exemplary Computer Environment:

FIG. 9 illustrates an exemplary general computer environment 900, which can be used to implement the techniques described herein, and which may be representative, in whole or in part, of elements described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing-based device in the form of a computer 902. Computer 902 can be, for example, a desktop computer, a handheld computer, a notebook or laptop computer, a server computer, a game console, and so on. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternately, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 927, one or more application programs 928, other program modules 930, and program data 932. Each of such operating system 927, one or more application programs 928, other program modules 930, and program data 932 (or some combination thereof) may implement all or part of the resident components that support the distributed file system.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing-based device 948. By way of example, the remote computing-based device 948 can be a personal computer, portable computer, a server, a router, a network computer, a peer device or other common network node, and the like. The remote computing-based device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing-based device 902, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described methods and computer describe direct access of language metadata in a programming language. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:
1. A computing device comprising:
 a memory;
 one or more processors operatively coupled to the memory;
 a compiler stored in the memory and executed by the one or more processors, the compiler operating to:
  receive an input script of a computer programming language, the computer programming language being associated with language metadata specifying runtime characteristics of the computer programming language; and
  generate an output program of machine code based on the input script and the language metadata;
 an interpreter stored in the memory and executed by the one or more processors, the interpreter operating to execute the output program based on the language metadata; and
 a language metadata provider to:
  produce one or more modifications to the language metadata based at least in part on language metadata commands to produce the one or more modifications to the language metadata, the one or more modifications including at least one of a new keyword, an operator, or a statement to be added to a grammar of the computer programming language,
  to provide the modified language metadata to the compiler and the interpreter, and
  to manipulate the language metadata at runtime and change language behavior.
2. The computing device of claim 1, wherein at least some of the one or more modifications to the language metadata are associated with a temporal period and do not impact at least one behavior of the computer programming language after a predetermined time.

3. The computing device of claim 1, wherein the compiler includes one or more of the following: a parse engine and a code generator.

4. The computing device of claim 1, wherein the compiler includes a parse engine that transforms the input script into a data structure that captures implied hierarchy of the input script.

5. The computing device of claim 1, wherein the compiler includes a code generator that receives a parse tree and generates the output program.

6. The computing device of claim 1, wherein the language metadata provider is included in at least one of the following: the compiler or the interpreter.

7. The computing device of claim 1, wherein the language metadata provider is configured to receive commands from a user.

8. An apparatus comprising:
a processor; and
a compiler comprising:
   a parse engine accessible to the processor to receive input script;
   a standard language grammar module accessible to the processor to define features of a programming language of the input script;
   an active profile module accessible to the processor to define a sequence of namespaces; and
   a language metadata provider accessible to the processor to:
      modify language metadata of the programming language, the language metadata specifying runtime characteristics of the programming language; and
      modify one or more of the namespaces based on respective modifications to the language metadata, each of the respective modifications being associated with a particular scope indicating one or more sessions for which to apply a respective modification.

9. The apparatus of claim 8, wherein the standard language grammar module defines the features of the programming language in a standard language grammar to extract syntax information of the programming language.

10. The apparatus of claim 8, wherein the active profile module defines the sequence of namespaces, wherein the namespaces are implemented in an array and each of the namespaces define particular elements.

11. The apparatus of claim 8, wherein the active profile module includes a dynamic collection of metadata used by the parse engine for parsing functions.

12. The apparatus of claim 8, wherein the language metadata provider includes namespace data utilized by the active profile module to provide nodes in a parse tree.

13. The apparatus of claim 8, wherein the language metadata provider includes logic for navigating and manipulating the language metadata.

14. A method comprising:
receiving one or more commands to modify language metadata of a programming language, the one or more commands indicating an addition of at least one of a new keyword, an operator, or a statement to the programming language, the language metadata specifying runtime characteristics of the programming language;
modifying the language metadata at runtime based on the one or more commands to produce modified language metadata and change language behavior;
modifying a grammar of the programming language based on the modified language metadata to add the at least one new keyword, operator, or statement to the programming language, the grammar of the programming language defining a syntax of the programming language; and
utilizing the modified language metadata as a feature at runtime for parsing one or more functions and for execution of an output program.

15. The method of claim 14, wherein the receiving the one or more commands includes intercepting the one or more commands and generating and maintaining modifiable language metadata.

16. The method of claim 14, wherein the modifying includes modifying one or more namespace elements.

17. The method of claim 14, wherein the utilizing includes utilizing the language metadata for one or more input scripts and one or more output programs.

18. The method of claim 14, further comprising adding a new syntactic, semantic, or lexical feature to the programming language based on the modified language metadata.

* * * * *